United States Patent
Park (10) Patent No.: US 11,163,188 B2
(45) Date of Patent: Nov. 2, 2021

(54) DISPLAY DEVICE

(71) Applicant: Samsung Display Co., Ltd., Yongin-Si (KR)

(72) Inventor: Seung Beom Park, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 16/563,997

(22) Filed: Sep. 9, 2019

(65) Prior Publication Data

US 2020/0117042 A1 Apr. 16, 2020

(30) Foreign Application Priority Data

Oct. 12, 2018 (KR) ........................ 10-2018-0121959

(51) Int. Cl.
    *G02F 1/1335* (2006.01)
(52) U.S. Cl.
    CPC .. *G02F 1/133504* (2013.01); *G02F 1/133512* (2013.01); *G02F 1/133528* (2013.01)
(58) Field of Classification Search
    CPC .............................................. G02F 2202/043
    See application file for complete search history.

(56) References Cited

U.S. PATENT DOCUMENTS

| | | | |
|---|---|---|---|
| 9,224,984 B2 | 12/2015 | Shim et al. | |
| 9,341,750 B2 | 5/2016 | Shim et al. | |
| 9,507,059 B2 | 11/2016 | Shim et al. | |
| 9,507,060 B2 | 11/2016 | Shim et al. | |
| 9,575,217 B2 | 2/2017 | Shim et al. | |
| 9,874,666 B2 | 1/2018 | Lee et al. | |
| 10,522,600 B2* | 12/2019 | Kim | H01L 51/5275 |
| 2010/0055353 A1* | 3/2010 | Cho | C09K 19/3068 |
| | | | 428/1.1 |
| 2016/0178810 A1 | 6/2016 | Chung et al. | |
| 2016/0252665 A1 | 9/2016 | Lee et al. | |
| 2018/0045876 A1 | 2/2018 | Lee et al. | |

FOREIGN PATENT DOCUMENTS

| | | |
|---|---|---|
| JP | 4348061 B2 | 10/2009 |
| JP | 2016161943 A | 9/2016 |
| JP | 6159385 B2 | 7/2017 |
| KR | 101616918 B1 | 4/2016 |
| KR | 101665239 B1 | 10/2016 |
| KR | 101813753 B1 | 1/2018 |
| KR | 1020180102486 A | 9/2018 |

* cited by examiner

*Primary Examiner* — Thoi V Duong
(74) *Attorney, Agent, or Firm* — Cantor Colburn LLP (57) ABSTRACT

A display device includes a liquid crystal display panel, and a plurality of optical layers disposed on the liquid crystal display panel, wherein the plurality of optical layers includes a polarizing layer including a linear polarizer, a light scattering layer disposed on the polarizing layer and including a first refractive pattern part and a second refractive pattern part, wherein a refractive index of the second refractive pattern part is greater than a refractive index of the first refractive pattern part; and a light blocking layer disposed on or below the linear polarizer layer, and including a dichroic pigment and a reactive mesogen.

20 Claims, 9 Drawing Sheets

DISPLAY DEVICE

CROSS-REFERENCE TO RELATED APPLICATION

This U.S. non-provisional patent application claims priority to Korean Patent Application No. 10-2018-0121959, filed on Oct. 12, 2018, and all the benefits accruing therefrom under 35 U.S.C. § 119, the entire content of which is incorporated herein by reference.

BACKGROUND

(1) Field

The present disclosure herein relates to a display device, and more particularly, to a display device including a plurality of optical layers disposed on a liquid crystal display panel.

(2) Description of the Related Art

Various types of display devices have been used to provide image information. Among the display devices, a liquid crystal display device advantageously has low power consumption and is thus may be used for display devices of various sizes, such as, for example, a large-size display device and a portable display device.

The liquid display device is configured to generate an image by directing light emitted from a backlight unit to a liquid crystal display panel. Also, the liquid crystal display device may further include an optical functional layer disposed on an outside of the liquid crystal panel in order to improve display quality according to a viewing angle.

SUMMARY

The present disclosure provides a display device that has improved display quality by reducing reflection caused by external light.

The present disclosure also provides a display device that improves degradation in the display quality due to external light, while maintaining excellent transmittance characteristics.

An embodiment provides a display device including: a liquid crystal display panel; and a plurality of optical layers disposed on the liquid crystal display panel, wherein the plurality of optical layers includes: a polarizing layer including a linear polarizer; a light scattering layer disposed on the polarizing layer and including a first refractive pattern part and a second refractive pattern part, wherein a refractive index of the second refractive index part is greater than a refractive index of the first refractive pattern part; and a light blocking layer disposed on or below the linear polarizer layer, and including a dichroic pigment and a reactive mesogen.

In an embodiment, the reactive mesogen may include a liquid crystal molecule and a polymerization group bonded to an end of the liquid crystal molecule.

In an embodiment, the liquid crystal molecule may be vertically aligned with respect to a top surface and/or a bottom surface of the light blocking layer, and the dichroic pigment may be disposed in parallel to the liquid crystal molecule.

In an embodiment, a major axis of the dichroic pigment and a major axis of the liquid crystal molecule may be each independently aligned at an angle of about 85° or greater and about 90° or less with respect to a top surface of the liquid crystal display panel.

In an embodiment, the light scattering layer may be disposed directly on the polarizing layer, and the light blocking layer may be disposed directly on the light scattering layer.

In an embodiment, the first refractive pattern part may include a plurality of protruding portions with each protruding portion extending in a lengthwise direction and having a stripe shape, and the second refractive pattern part may include a plurality of recessed portions corresponding to the plurality of protruding portions.

In an embodiment, the first refractive pattern part may include a plurality of cavities defined in a top surface thereof, and the second refractive pattern part may include a plurality of projections nested in the plurality of cavities.

In an embodiment, at least one of the first refractive pattern part or the second refractive pattern part may further include at least one scattering particle of $TiO_2$, $SiO_2$, ZnO, $Al_2O_3$, $BaSO_4$, $CaCO_3$, or $ZrO_2$.

In an embodiment, at least one of the first refractive pattern part or second refractive pattern part may further include a light absorbing agent.

In an embodiment, a difference between the refractive index of the second refractive pattern part and the refractive index of the first refractive pattern part may be about 0.1 or greater.

In an embodiment, an amount of the dichroic pigment and the reactive mesogen may be each independently about 0.1 weight percent (wt %) or greater and about 20 wt % or less, based on a total weight of the dichroic pigment and the reactive mesogen.

In an embodiment, the light blocking layer may be disposed directly on a top surface of the polarizing layer, and the light scattering layer may be disposed directly on a top surface of the light blocking layer.

In an embodiment, the light blocking layer may be disposed directly on a bottom surface of the polarizing layer, and the light scattering layer may be disposed directly on a top surface of the polarizing layer.

In an embodiment, the polarizing layer may further include a protection layer disposed on and below the linear polarizer layer.

In an embodiment, the light blocking layer may be disposed between the linear polarizer layer and the protection layer.

In an embodiment, the light scattering layer may be disposed directly on the polarizing layer, the light blocking layer may be disposed below the polarizing layer, and the plurality of optical layers may further include an adhesive layer disposed between the light blocking layer and the polarizing layer.

In an embodiment, the plurality of optical layers may further include a base substrate, and the base substrate may be an uppermost layer of the plurality of optical layers.

In an embodiment, a display device includes: a liquid crystal display panel including a first substrate and a second substrate, which face each other, and a liquid crystal layer disposed between the first substrate and the second substrate; a first polarizing layer disposed on the liquid crystal display panel; a second polarizing layer disposed below the liquid crystal display panel; a light scattering layer disposed on the first polarizing layer and including a first refractive pattern part and a second refractive pattern part disposed on the first refractive pattern part, wherein a refractive index of the second refractive pattern part is greater than a refractive index of the first refractive pattern part; and a light blocking layer disposed on or below the polarizing layer, and including a dichroic pigment and a reactive mesogen.

In an embodiment, the reactive mesogen may include a liquid crystal molecule, and a major axis of the liquid crystal molecule may be vertically aligned respect to a top surface or a bottom surface of the polarizing layer.

In an embodiment, a major axis of the dichroic pigment may be parallel to an extension direction of the major axis of the liquid crystal molecule.

BRIEF DESCRIPTION OF THE FIGURES

The drawings are included to provide a further understanding of the advantages and features of this disclosure, and are incorporated in and constitute a part of this specification. The above and other advantages and features of this disclosure will become more apparent by describing in further detail exemplary embodiments thereof with reference to the accompanying drawings, in which.

DETAILED DESCRIPTION

Since the present disclosure may have diverse modified embodiments, specific embodiments are illustrated in the drawings and are described in the detailed description. However, this does not limit the present disclosure to the embodiments set forth herein, and it should be understood that the present disclosure covers all the modifications, equivalents, and replacements within the idea and technical scope of the present disclosure.

Like reference numerals refer to like elements throughout. In the drawings, the dimensions and size of each structure are exaggerated, omitted, or schematically illustrated for convenience in description and clarity. It will be understood that although the terms of first and second are used herein to describe various elements, these elements should not be limited by these terms. The terms are only used to distinguish one component from other components. For example, a first element referred to as a first element in one embodiment can be referred to as a second element in another embodiment. The terms of a singular form may include plural forms unless referred to the contrary.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

In the specification, it will be understood that when a layer (or film), a region, or a plate is referred to as being 'on' another layer, region, or plate, it can be directly on the other layer, region, or plate, or intervening layers, regions, or plates may also be present. On the contrary to this, it will be understood that when a layer, a film, a region, or a plate is referred to as being 'under' another layer, region, or plate, it can be directly under the other layer (or film), region, or plate, or intervening layers, regions, or plates may also be present. In the figures, the dimensions of layers and regions are exaggerated for clarity of illustration.

In the specification, when an element is referred to as being "directly on" another element, no intervening elements may be present between a component such as a layer, a film, a region, or a plate and another component. For example, the expression "disposed directly on" will be understood as referring to an element which is directly disposed on or connected to another element, and another element is not present therebetween.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

As used herein, "acryl" includes acrylic, methacrylic, (C1 to C20 alkyl)acrylate, and (C1 to C20-alkyl)methacrylate.

Hereinafter, a display device according to an embodiment will be described with reference to the accompanying drawings.

Figure 1:
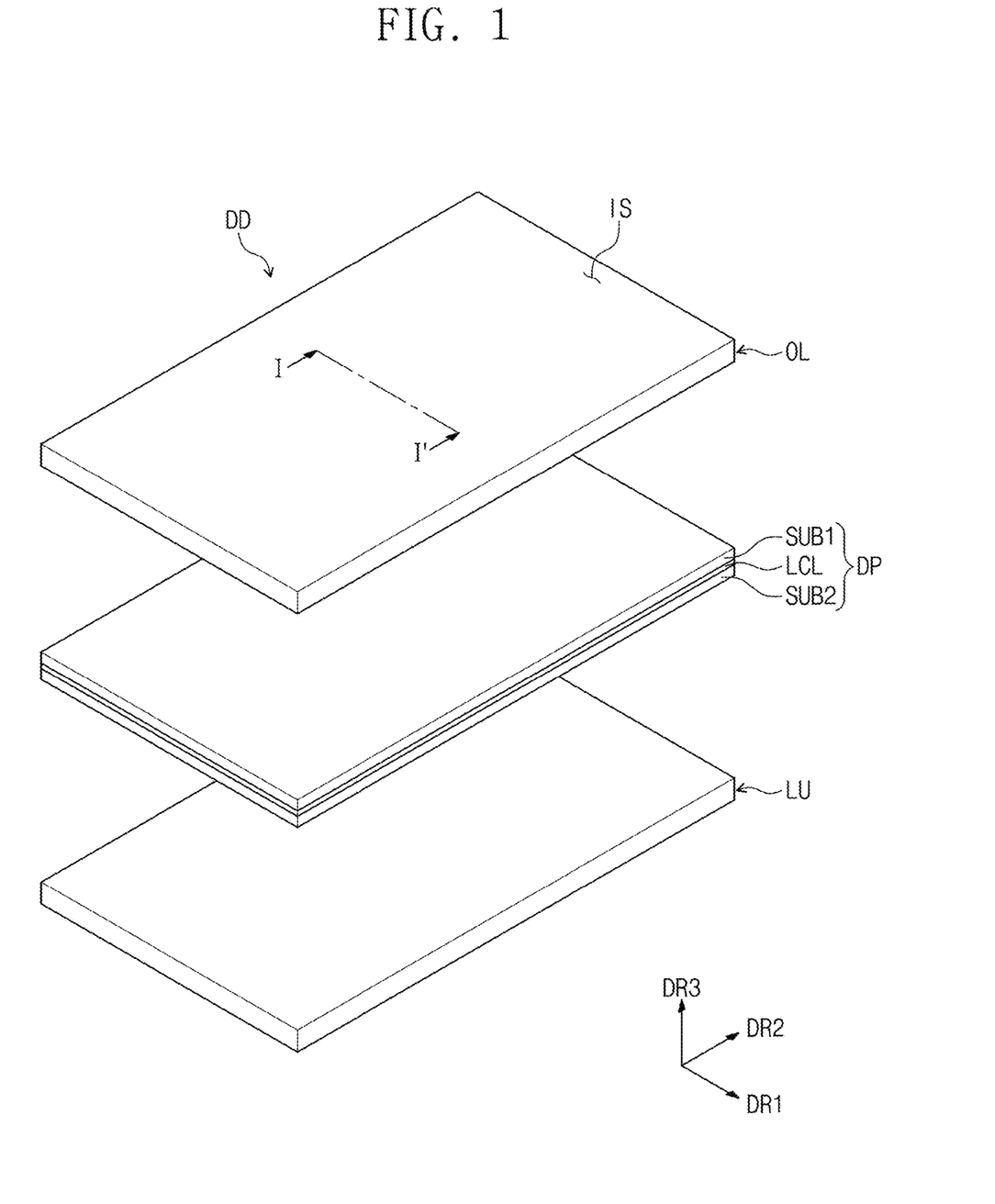
FIG. 1 is a perspective view illustrating a display device, according to an embodiment.
Figure 2:
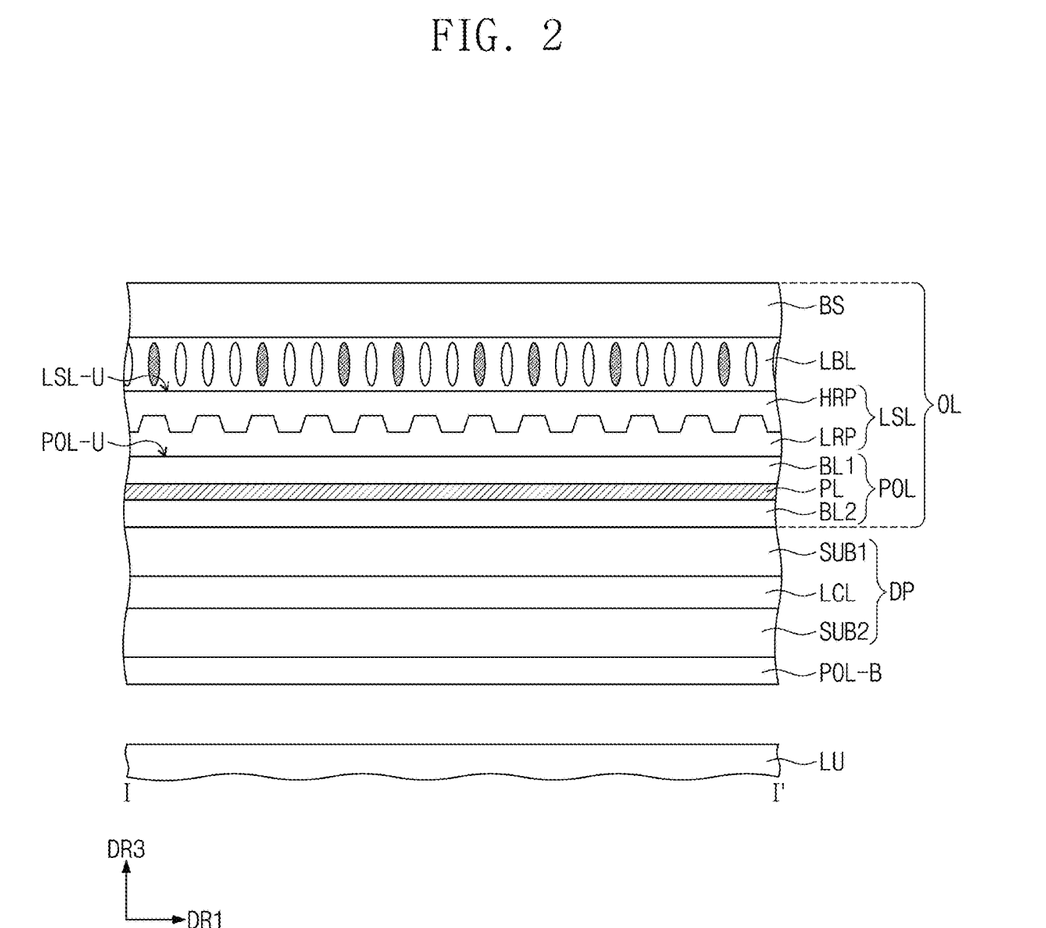
FIG. 2 is a cross-sectional view taken along line I-I' of FIG. 1.

FIG. 1 is an exploded perspective view illustrating a display device DD according to an embodiment. FIG. 2 is a cross-sectional view taken along line I-I' of the display device DD according to an embodiment in FIG. 1.

The display device DD according to an embodiment may include a light source part LU, a liquid crystal display panel DP disposed on the light source part LU, and a plurality of optical layers OL disposed on the liquid crystal display panel DP. That is, the display device DD according to an embodiment may include the light source part LU, the liquid crystal display panel DP, and the plurality of optical layers OL, which are sequentially laminated along a third directional axis DR3.

Although a first directional axis DR1, a second directional axis D2, and a third directional axis DR3 are illustrated in FIG. 1, the directional axes described in this specification may be relative concepts, and, for convenience of description, a direction of the third directional axis DR3 may be defined as a direction in which an image is displayed. Also, the first directional axis DR1 and the second directional axis DR2 may be perpendicular to each other, while the third directional axis DR3 may extend in a vertical direction with respect to a plane defined by the first directional axis DR1 and the second directional axis DR2.

Hereinafter, a front surface (or top surface) and a rear surface (or bottom surface) of each of the members or units are distinguished by the third directional axis DR3. However, the first to third directional axes DR1, DR2, and DR3 in the embodiments are only exemplarily illustrated. Hereinafter, first to third directions may be directions indicated by the first to third directional axes DR1, DR2, and DR3 and designated by the same reference numerals, respectively.

Although not shown, the light source part LU may include a light source including a plurality of light emitting elements. The light source may be disposed below the liquid crystal display panel DP while overlapping the liquid crystal display panel DP. For example, the light source may be a direct-type light source. Alternatively, the light source may be an edge-type light source that is disposed at one side of the liquid crystal display panel DP while not overlapping the liquid crystal display panel DP.

The light source part LU may include a guide part configured to transmit light emitted from the light source to the liquid crystal display panel DP, in addition to the light source emitting light. The guide part may include a light guide plate, a light collecting layer provided on the light guide plate, or a reflection layer provided below the light guide plate.

The liquid crystal display panel DP is disposed on the light source part LU. The liquid crystal display panel DP may be spaced a predetermined distance from a top surface of the light source part LU.

The liquid crystal display panel DP may include a first substrate SUB1 and a second substrate SUB2, which face each other, with a liquid crystal layer LCL disposed therebetween.

The liquid crystal display panel DP may be divided into a display area and an edge area surrounding the display area. The display area is an area on which an image is displayed on a plane, and the edge area is an area disposed adjacent to the display area and on which an image is not displayed on the plane. The liquid crystal display panel DP may include a plurality of pixels disposed on the display area.

The liquid crystal display panel DP may provide an image toward a display surface IS. In the display device DD according to an embodiment, the display surface IS may be an outermost layer of the plurality of optical layers OL.

A signal line and a pixel circuit composed of the pixels are provided on one (hereinafter, referred to as an array substrate) of the first substrate SUB1 and the second substrate SUB2. The array substrate may be connected to a main circuit board through a chip on film (COF) or the like. A central control circuit for driving the liquid crystal display panel DP may be disposed on the main circuit board. The central control circuit may be a microprocessor. A chip of the chip on film (COF) may be a data driving circuit. A gate driving circuit may be mounted to the array substrate or integrated on the array substrate as a low temperature poly-silicone (LTPS) type.

The liquid crystal layer LCL includes a liquid crystal (liquid crystal molecule). The liquid crystal layer LCL of the liquid crystal display panel DP according to an embodiment may include a vertically oriented liquid crystal. The liquid crystal contained in the liquid crystal layer LCL may be vertically oriented with respect to the first substrate SUB1 and/or the second substrate SUB2. For example, the liquid crystal according to an embodiment in FIG. 2 may be oriented at an angle of about 88° or greater and about 90° or less with respect to a bottom surface of the first substrate SUB1 and/or a top surface of the second substrate SUB2. In the display device DD according to an embodiment, the first substrate SUB1 may be a display panel in a vertical orientation mode.

However, the embodiment is not limited thereto. For example, the liquid crystal display panel DP of the display device DD according to an embodiment may include display panels in a twisted nematic (TN) mode, a super vertical alignment (SVA) mode, a super patterned vertical alignment (S-PVA) mode, an optically compensate bend (OCB) mode, or an electrically controlled birefringence (ECB) mode. Alternatively, the liquid crystal display panel DP may have other methods for driving (operating) the display panel and other orientation direction methods of aligning a liquid crystal molecule which differ from the above examples.

A first polarizing layer POL and a second polarizing layer POL-B may be disposed on upper and lower surfaces of the liquid crystal display panel DP. In FIG. 2, a first (upper) polarizing layer POL is disposed on the first substrate SUB1 that is an upper substrate of the liquid crystal display panel DP, and a second (lower) polarizing layer POL-B is disposed below the second substrate SUB2 that is a lower substrate of the liquid crystal display panel DP.

The first polarizing layer POL includes a linear polarizer layer PL. Also, the first polarizing layer POL may further include a first protection layer BL1 and a second protection layer BL2 disposed on upper and lower surfaces of the linear polarizer PL, respectively. The linear polarizer layer PL may linearly polarize light in a single direction. The linear polarizer layer PL may be a film-type layer including an elongated polymer film. For example, the elongated polymer film may be an elongated polyvinylalcohol (PVA)-based film. Also, the linear polarizer layer PL may be a coating-type polarizing layer (e.g., formed by a coating method).

The linear polarizer layer PL may be manufactured by adsorbing a dichroic dye to a surface of the elongated polymer film. For example, the linear polarizer layer PL may be manufactured by adsorbing iodine onto the elongated polyvinylalcohol-based film. Here, an elongation direction of the polymer film may be an absorption axis of the linear polarizer layer PL, and a direction perpendicular to the elongated direction may be a transmission axis of the linear polarizer layer PL.

Also, the upper polarizing layer POL may include a first protection layer BL1 and a second protection layer BL2 disposed on at least one of a top surface or a bottom surface of the linear polarizer layer PL. The first and second protection layers BL1 and BL2 may include, for example, cellulose triacetate (TAC).

Although not shown in FIG. 2, the lower polarizing layer POL-B may have the same configuration as that of the upper polarizing layer POL provided on the first substrate SUB1. For example, the lower polarizing layer POL-B may include a linear polarizer layer and a protection layer provided on at least one of a top surface or a bottom surface of the linear polarizer layer.

Alternatively, the lower polarizing layer POL-B may be an in-cell type polarizing layer disposed between the second substrate SUB2 and the liquid crystal layer LCL. The lower polarizing layer POL-B may be a coating-type polarizing layer or a deposition-type polarizing layer (e.g., formed through deposition). The lower polarizing layer POL-B may be formed by applying a material containing a dichroic dye and a liquid crystal compound (molecule). Alternatively, the lower polarizing layer POL-B may be a wire-grid-type polarizing layer. The lower polarizing layer POL-B also may be a film-type polarizing layer disposed below the liquid crystal display panel DP. In this case, an adhesive layer may be further disposed between the lower polarizing layer POL-B and the liquid crystal display panel DP.

The transmission axis of the linear polarizer layer PL contained in the upper polarizing layer POL disposed on the first substrate SUB1 and the transmission axis of the linear polarizer layer PL contained in the lower polarizing layer POL-B may be perpendicular to each other. However, the embodiment is not limited thereto.

Also, the upper and lower polarizing layers POL and POL-B may include an acryl polymer film or a cyclo-olefin polymer film as a support layer. The support layer may be a thin film having a thickness of about 10 micrometers (μm) or less, or about 5 μm or less, or about 1 μm or less.

Also, the first and second polarizing layers POL and POL-B may further include a phase retardation layer, a light compensation layer, or a combination thereof. The phase retardation layer, the light compensation layer, or the combination thereof, may be disposed on the top surface or the bottom surface of the linear polarizer layer PL. For example, an adhesive layer may be further provided between the linear polarizer layer PL and the phase retardation layer or between the linear polarizer layer PL and the light compensation layer.

The plurality of optical layers OL of the display device DD, according to an embodiment, includes a light scattering layer LSL. The light scattering layer LSL may be disposed on the first (upper) polarizing layer POL. The light scattering layer LSL may be disposed directly on a top surface POL-U of the first polarizing layer POL. Also, in an embodiment illustrated in FIG. 7, for example, a light blocking layer LBL may be disposed between the first polarizing layer POL and the light scattering layer LSL, and, in this case, the light scattering layer LSL may be directly disposed on the light blocking layer LBL.

The light scattering layer LSL may include a low refractive pattern part LRP and a high refractive pattern part HRP.

The first refractive pattern part LRP (also referred to herein as a low refractive pattern part) and a second refractive pattern part HRP (also referred to herein as a high refractive pattern part) may have different refractive indexes from each other. For example, the low refractive pattern part LRP may have a refractive index of about 1 or greater and about 1.5 or less, or about 1 or greater and about 1.4 or less, or about 1 or greater and about 1.2 or less, and the high refractive pattern part HRP may have a refractive index of about 1.2 or greater and about 1.7 or less, or about 1.2 or greater and about 1.6 or less, or about 1.2 or greater and about 1.5 or less. The high refractive pattern part HRP may have a refractive index greater than the refractive index of the low refractive pattern part LRP, and a difference between the refractive indices of the high refractive pattern part HRP and the low refractive pattern part LRP may be about 0.1 or greater. For example, the high refractive pattern part HRP may have a refractive index of about 1.6 or less, the low refractive pattern part LRP may have a refractive index of about 1.47 or less, and the difference between the refractive index of the high refractive pattern part HRP and the refractive index of the low refractive index part LRP may be about 0.1 to about 0.2.

The light scattering layer LSL may change a path of light output by the liquid crystal display panel DP, by including the low refractive pattern part LRP and the high refractive pattern part HRP, which have different refractive indexes from each other, and refracting light incident to the light scattering layer LSL in various directions. For example, a path of light at a boundary between the low refractive pattern part LRP and the high refractive pattern part HRP is changed, since the light scattering layer LSL may scatter the light in different directions according to a shape of the boundary between the low refractive pattern part LRP and the high refractive pattern part HRP. Accordingly, the light scattering layer enhances display quality by minimizing degradation depending on a viewing angle of the display device DD, according to an embodiment.

Each of the low refractive pattern part LRP and the high refractive pattern part HRP may be formed of a polymer resin. For example, each of the low refractive pattern part LRP and the high refractive pattern part HRP may be formed of a transparent polymer resin. The polymer resin of the low refractive pattern part LRP and the polymer resin of the high refractive pattern part HRP may be different from each other.

The high refractive pattern part HRP may be formed of a urethane resin, e.g., polyurethane. The low refractive pattern part LRP may be formed of an acryl resin, e.g., poly butyl acrylate.

Each of the low refractive pattern part LRP and the high refractive pattern part HRP may further include a scattering particle or a light absorbing agent in addition to the polymer resin. The scattering particle may improve a degree of light scattering incident to the light scattering layer LSL. The light scattering layer may include at least one scattering particle of $TiO_2$, $SiO_2$, ZnO, $Al_2O_3$, $BaSO_4$, $CaCO_3$, or $ZrO_2$. The scattering particle may be present in at least one of the low refractive pattern part LRP or the high refractive pattern part HRP. Also, the light absorbing agent may include an ultraviolet (UV) light absorbing agent.

Figure 3A:
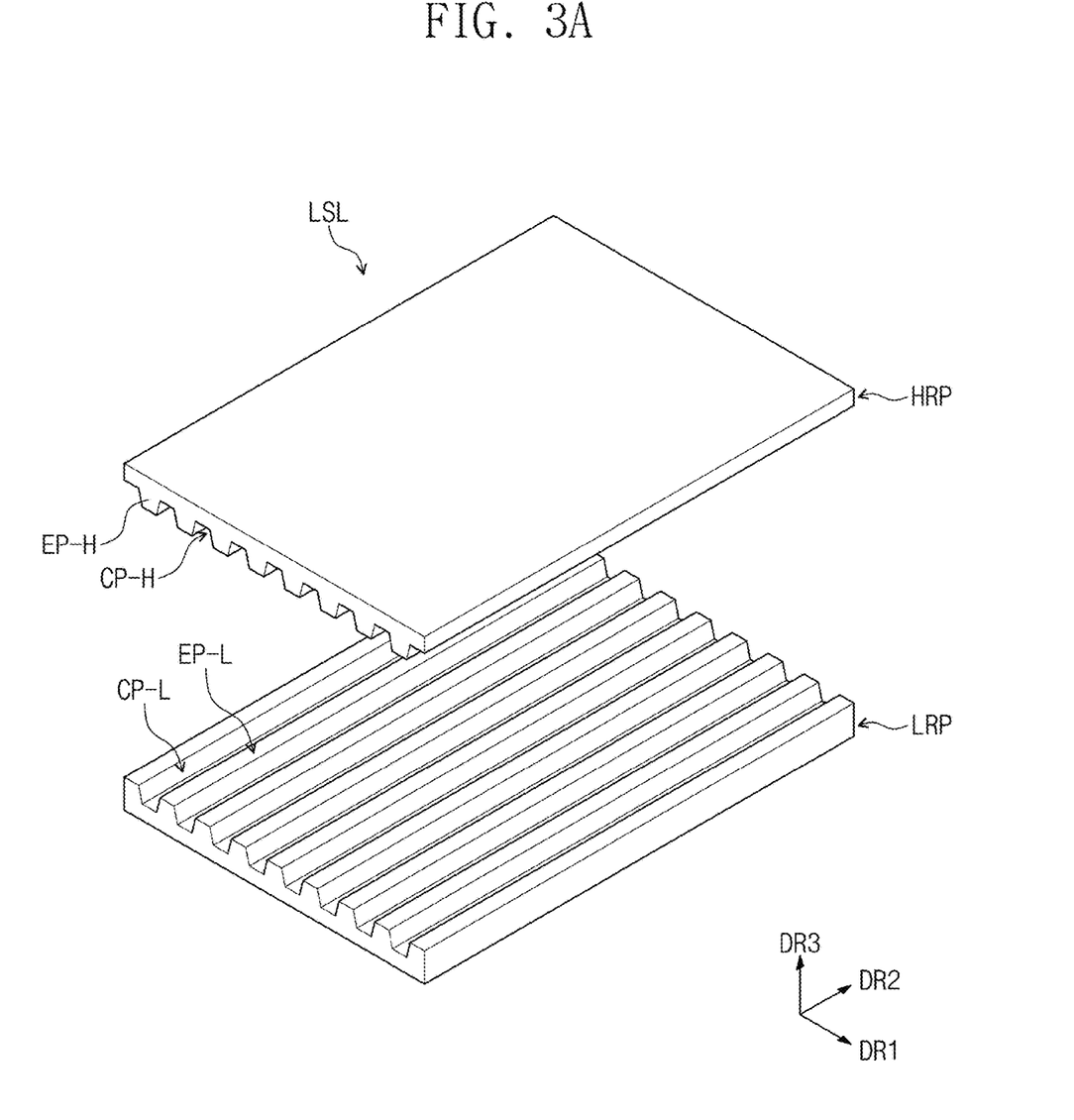
FIG. 3A is a perspective view illustrating a light scattering layer, according to an embodiment.
Figure 3B:
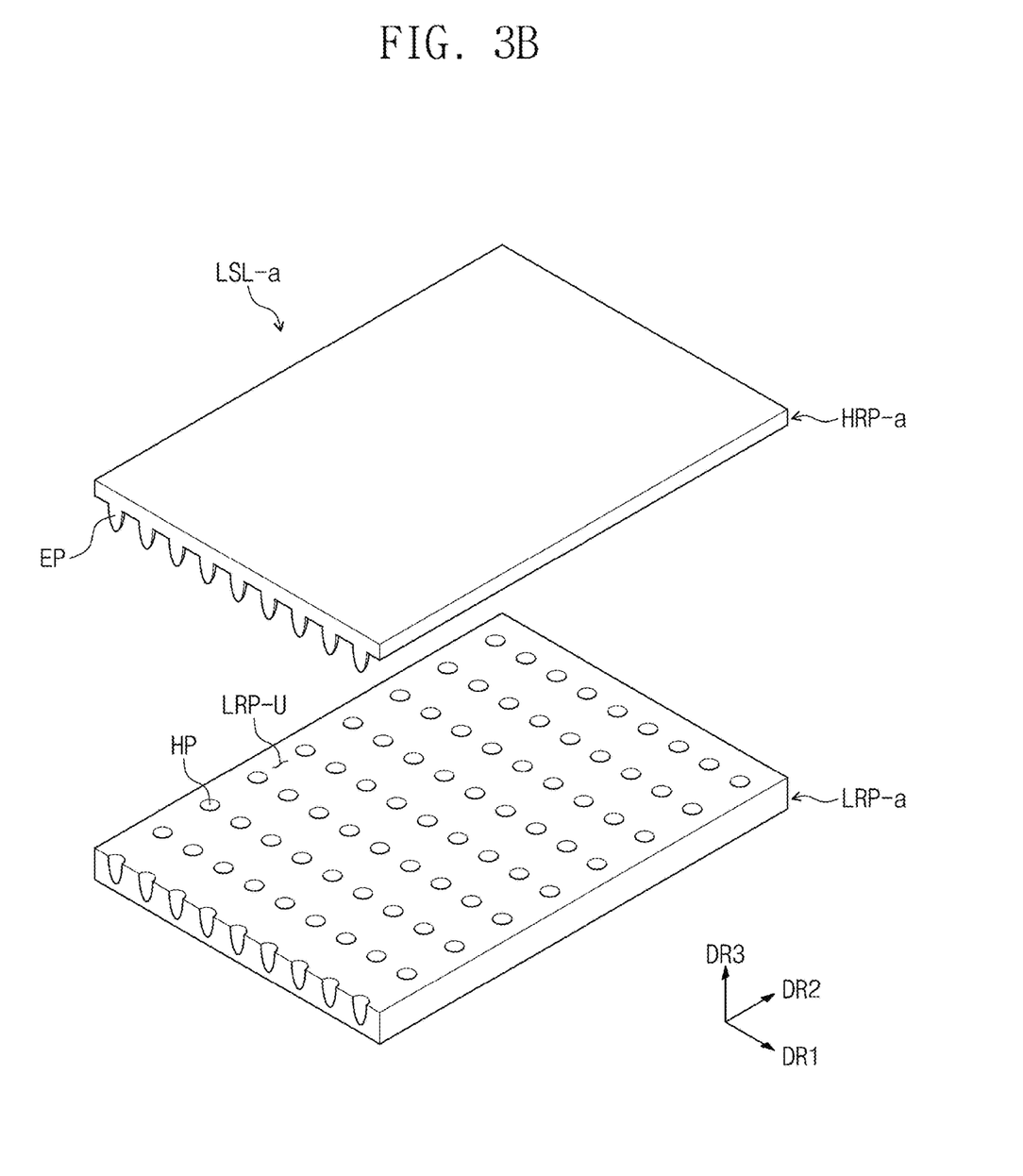
FIG. 3B is a perspective view illustrating a light scattering layer, according to another embodiment.

FIG. 3A is a perspective view illustrating a light scattering layer LSL, according to an embodiment, and FIG. 3B is a perspective view illustrating a light scattering layer LSL-a, according to another embodiment. In FIGS. 3A and 3B, embodiments of the light scattering layer LSL and LSL-a are exemplarily illustrated. However, the embodiments are not limited to the shape of each of the low refractive pattern part and the high refractive pattern part illustrated in the light scattering layer LSL and LSL-a in FIGS. 3A and 3B.

Referring to an embodiment in FIG. 3A, the low refractive pattern part LRP may include a plurality of protruding portions EP-L. Each of the plurality of protruding portions EP-L may extend in a single direction (e.g., a length direction, DR2) and may be in the form of, for example, a stripe shape. The low refractive pattern part LRP may include the plurality of protruding portions EP-L, and a plurality of recessed portions CP-L may be defined between the protruding portions EP-L, which are disposed adjacent to each other. The low refractive pattern part LRP thus has a configuration of alternating protruding portions EP-L and recessed portions CP-L.

The high refractive pattern part HRP may include a plurality of recessed portions CP-H, which correspond to the position of the protruding portions EP-L in the low refractive pattern part LRP. The high refractive pattern part HRP may also include a high refractive protruding portion EP-H disposed between the recessed portions CP-H. As a result, the high refractive pattern part HRP thus has a configuration of alternating protruding portions EP-H and recessed portions CP-H.

The recessed portions CP-L (e.g., grooves) defined by the protruding portions EP-L of the low refractive pattern part LRP may correspond to the high refractive protruding portions EP-H of the high refractive pattern part HRP. Similarly, the recessed portions CP-H (grooves) defined by the protruding portions EP-H of the high refractive pattern part HRP may correspond to the low refractive protruding portions EP-L. For example, the protruding portions EP-L of the low refractive pattern part LRP may be inserted (e.g., nested) in the recessed portions CP-H of the high refractive pattern part HRP, and the protruding portions EP-H of the high refractive pattern part LRP may be inserted (e.g., nested) in the recessed portions CP-L of the low refractive pattern part LRP.

Referring to FIG. 3A, a cross-section of each of the protruding portions EP-L of the low refractive pattern part LRP may have a cross-section having a trapezoidal shape as observed on a plane parallel to a plane defined by the first directional axis DR1 and the third directional axis DR3. However, the embodiment is not limited thereto. The cross-sectional shape of each of the protruding portions EP-L may be variously changed according to a light extracting efficiency of the light scattering layer LSL. For example, a top surface of each of the protruding portions EP-L may have a curved shape or a prism shape (not shown).

Also, the low refractive pattern part LRP may be an adhesive or coupling layer. For example, the low refractive pattern part LRP may serve as a coupling member for coupling the optical layer disposed adjacent thereto and the light scattering layer LSL. For example, the low refractive pattern part LRP may be an optically clear adhesive layer.

FIG. 3B is a perspective view illustrating the light scattering layer LSL-a according to an embodiment. Referring to FIG. 3B, the light scattering layer LSL-a according to an embodiment may include a low refractive pattern part LRP-a and a high refractive pattern part HRP-a disposed on the low refractive pattern part LRP-a. However, the embodiment is not limited thereto. For example, unlike illustrated in the drawings, the high refractive pattern part HRP-a may be disposed below the low refractive pattern part LRP-a.

In the light scattering layer LSL-a according to an embodiment, the low refractive pattern part LRP-a may include a plurality of cavities HP defined in a top surface LRP-U of the low refractive pattern part LRP-a. Also, the high refractive pattern part HRP-a may include a plurality of projections EP corresponding to the plurality of cavities HP and extending outward from a bottom surface of the high refractive pattern part HRP-a. The projections EP of the high refractive pattern part HRP-a may correspond one-to-one to the cavities HP of the low refractive pattern part LRP-a. The projections EP of the high refractive pattern part HRP-a may be filled (nested) in the cavities HP of the low refractive pattern part LRP-a. In other words, when the high refractive pattern part HRP-a and the low refractive pattern part LRP-a are joined together, the plurality of projections EP on the surface of the high refractive pattern part HRP-a are nested within the cavities HP of the low refractive pattern part LRP-a.

Alternatively, in the light scattering layer LSL-a according to an embodiment, the low refractive pattern part LRP-a may include a plurality of projections, and a plurality of cavities may be defined in a surface of the high refractive pattern part HRP-a disposed adjacent to the low refractive pattern part LRP-a, and when the high refractive pattern part HRP-a and the low refractive pattern part LRP-a are joined together, the plurality of projections on the surface of the low refractive pattern part LRP-a are nested within the cavities of the high refractive pattern part HRP-a.

The number, size, and distance between the projections EP and the cavities HP of the light scattering layer LSL-a, according to an embodiment, may be variously changed according to a light extraction efficiency of the light scattering layer LSL-a.

Figure 4:
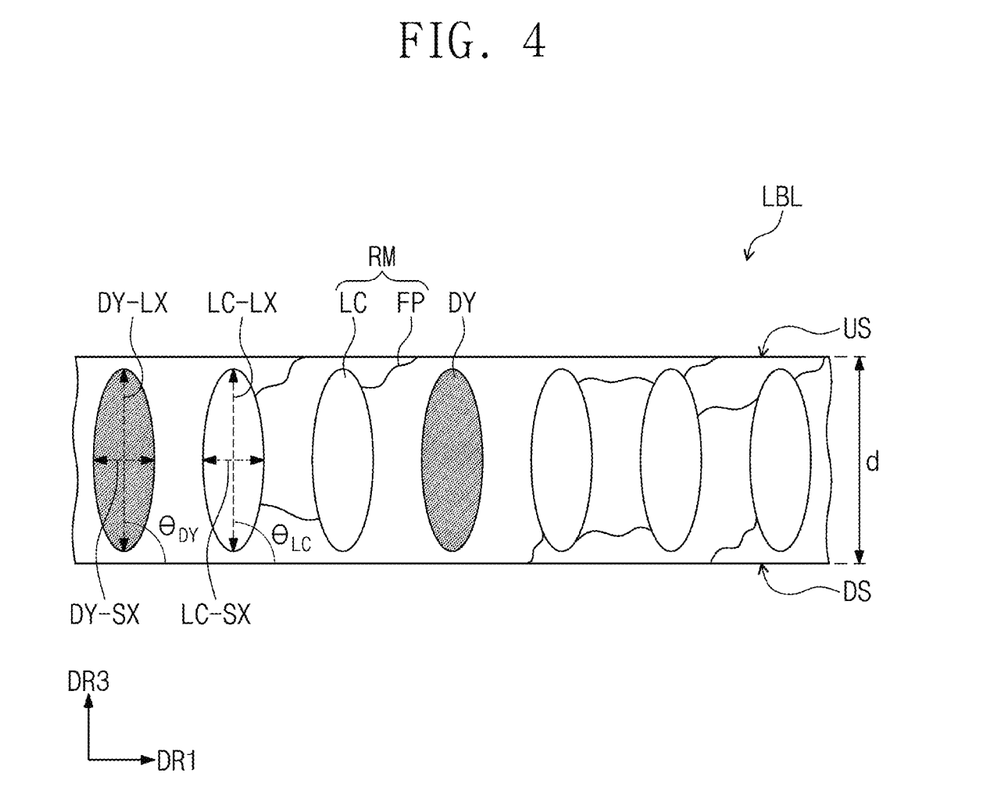
FIG. 4 is a cross-sectional view illustrating a light blocking layer, according to an embodiment.

Referring to FIG. 2 again, the display device DD according to an embodiment may include the light blocking layer LBL as a layer in the plurality of optical layers OL. FIG. 4 is a cross-sectional view illustrating the light blocking layer LBL, according to an embodiment.

Referring to FIGS. 2 and 4, in the light blocking layer LBL according to an embodiment, a transmittance of light incident in a vertical direction (e.g., third directional axis DR3) with respect to a top surface US or a bottom surface DS of the light blocking layer LBL may be greater than a transmittance of light incident at an inclined angle with respect to the top surface US or the bottom surface DS of the light blocking layer LBL. For example, when a display surface (front direction) of the display device DD has a viewing angle of about 0°, the light blocking layer LBL may block light incident on the display surface in a direction in which an absolute value of the viewing angle increases.

The light blocking layer LBL may include a dichroic pigment DY and a reactive mesogen RM. The reactive mesogen RM may include a liquid crystal molecule LC. Herein, the liquid crystal molecule LC may represent a monomer unit of a liquid crystal including the reactive mesogen RM. The reactive mesogen RM may be a nematic reactive liquid crystal. The dichroic pigment DY may be an azo-based pigment. The azo-based pigment includes at least one azo group (—N=N—) and may be any azo-based pigment suitable for use in a display device.

The liquid crystal molecule LC, which is a monomer unit of the reactive mesogen RM, may have an elongated bar shape in which a length of a major axis LC-LX is greater than a width of a minor axis LC-SX. The dichroic pigment DY may also have an elongated bar shape in which a length of a major axis DY-LX is greater than a width of a minor axis DY-SX.

The reactive mesogen RM may further include a polymerization group FP coupled to an end of the liquid crystal molecule LC. The reactive mesogen RM may include at least one polymerization reactive group FP coupled to the end of the liquid crystal molecule LC, and the polymerization reactive group FP may react with a polymerization reactive group on an adjacent liquid crystal molecule LC, through a thermal-curing or ultraviolet curing process. The polymerization reactive group may be an acryl group.

For example, the polymerization reactive group may be at least one of formulas P-1 to P-9. In formulas P-1 to P-9, "*" represents a portion of the group connected to the liquid crystal molecule LC (monomer unit).

The polymerization reactive group FP may react in the thermal curing process or the ultraviolet curing process to fix the liquid crystal molecule LC. The liquid crystal molecules LC, which are disposed adjacent to each other, may be coupled and fixed, i.e., covalently crosslinked, to each other by the polymerization reactive group.

The major axis LC-LX of the liquid crystal molecule LC may be substantially parallel to the direction of the third directional axis DR3, which is a thickness direction of the light blocking layer LBL. An angle $\theta_{LC}$ of the major axis LC-LX of the liquid crystal molecule LC with respect to the bottom surface DS of the light blocking layer LBL, i.e., the angle of an extension direction, may be about 85° or greater and about 90° or less. For example, the angle $\theta_{LC}$ of an extension direction of the major axis LC-LX of the liquid crystal molecule LC with respect to the bottom surface DS of the light blocking layer LBL may be about 88° or greater and about 90° or less, or about 89° or greater and about 90° or less. That is, the liquid crystal molecule LC contained in the light blocking layer LBL may be substantially vertically oriented.

An orientation angle $\theta_{LC}$ of the liquid crystal molecule LC contained in the light blocking layer LBL may be an aligned at angle with respect to a top surface of the liquid crystal display panel DP. That is, the orientation angle $\theta_{LC}$ of the liquid crystal molecule LC in the light blocking layer LBL may be inclined at an angle with respect to a plane that is substantially parallel to the top surface of the liquid crystal display panel DP.

The dichroic pigment DY may be oriented so that an extension direction of the major axis DY-LX of the dichroic pigment DY is substantially parallel to an extension direction of the major axis LC-LX of the liquid crystal molecule LC. The major axis DY-LX of the dichroic pigment DY may be substantially parallel to the direction of the third directional axis DR3, which is the thickness direction of the light blocking layer LBL. An angle $\theta_{DY}$ of the extension direction of the major axis DY-LX of the dichroic pigment DY with respect to the bottom surface DS of the light blocking layer LBL may be about 85° or greater and about 90° or less. For example, the angle $\theta_{DY}$ of the extension direction of the major axis DY-LX of the dichroic pigment DY with respect to the bottom surface DS of the light blocking layer LBL may be about 88° or greater and about 90° or less, or about 89° or greater and about 90° or less. That is, the dichroic pigment DY contained in the light blocking layer LBL may be substantially vertically oriented with respect to the bottom surface DS of the light blocking layer LBL.

Also, the dichroic pigment DY may absorb a substantial portion of light incident in parallel to the direction of the major axis DY-LX of the dichroic pigment DY and transmit a substantial portion of light incident in parallel to the minor axis DY-SX perpendicular to the major axis DY-LX. Accordingly, the light blocking layer LBL including the vertically oriented dichroic pigment DY may transmit a substantial portion of light incident in a vertical direction with respect to the display surface IS (refer to FIG. 1) of the display device DD and absorb light incident at an inclined angle with respect to the display surface IS (refer to FIG. 1) of the display device DD. An amount of light absorbed by the dichroic pigment DY may vary according to an angle of the light incident to the light blocking layer LBL.

When the light blocking layer LBL includes the dichroic pigment DY and the reactive mesogen RM, an amount of the dichroic pigment DY may be about 0.1 weight percent (wt %) or greater and about 20 wt % or less, or about 1 wt % or greater and about 15 wt % or less, or about 5 wt % or greater and about 10 wt % or less, based on a total weight of the dichroic pigment DY and the reactive mesogen RM. When a weight of the dichroic pigment DY on the basis of the total weight is less than about 0.1 wt %, the ability of the dichroic pigment to effectively of block light incident to the light blocking layer LBL may be degraded, and when a weight of the dichroic pigment DY on the basis of the total weight is greater than about 20 wt %, as an amount of light absorbed by the light blocking layer LBL increases, a luminance of the display device DD may decrease.

In an embodiment, the light blocking layer LBL may have a thickness d of about 2 μm or greater and about 10 μm or less. For example, the light blocking layer LBL may have a thickness d of about 3 μm or greater and about 5 μm or less.

Referring to FIG. 2 again, the plurality of optical layers OL includes the polarizing layer POL, the light scattering layer LSL, and the light blocking layer LBL. The plurality of optical layers OL may further include a base substrate BS. The base substrate BS may serve as a base for supporting the plurality of optical layers OL such as the polarizing layer POL, the light scattering layer LSL, and the light blocking layer LBL.

The base substrate BS may be made of a polymer resin. For example, the base substrate BS may include a polycarbonate resin, a polyethylene terephthalate resin, or a polyacrylate resin. The base substrate BS may have a high light transmittance and an optical isotropy. The base substrate BS may be, for example, a transparent film.

The base substrate BS may be an uppermost layer of the plurality of optical layers OL. The base substrate BS may be disposed on an uppermost portion of the plurality of optical layers OL to protect the optical functional layers such as the polarizing layer POL, the light scattering layer LSL, and the light blocking layer LBL.

At least one functional coating layer (not shown) may be further provided on a top surface of the base substrate BS. The functional coating layer may include a reflection preventing layer, a hard coating layer, a fingerprint proof coating layer, a pollution preventing layer, or a combination thereof.

In the display device DD according to an embodiment, the plurality of optical layers OL may be disposed above the liquid crystal display panel DP, and one of the optical layers OL may be disposed directly on the liquid crystal display panel DP. Also, an adhesive layer (not shown) may be further provided between the liquid crystal display panel DP and the optical layers OL.

Also, a portion of an optical layer such as the polarizing layer POL, the light scattering layer LSL, and/or the light blocking layer LBL, may be directly disposed on the optical layers disposed adjacent thereto. In an embodiment shown in FIG. 2, the light scattering layer LSL may be disposed directly on the polarizing layer POL. Also, the light blocking layer LBL may be disposed directly on the light scattering layer LSL.

The display device DD including both the light scattering layer LSL and the light blocking layer LBL in the plurality of optical layers OL, according to an embodiment, may decrease degradation of a display quality caused by light from outside of the display device DD and which is incident on the display device, while improving an optical characteristic according to a viewing angle. Also, the display device DD according to an embodiment may decrease the degradation in the display quality due to external light while maintaining a luminance characteristic.

Figure 5:
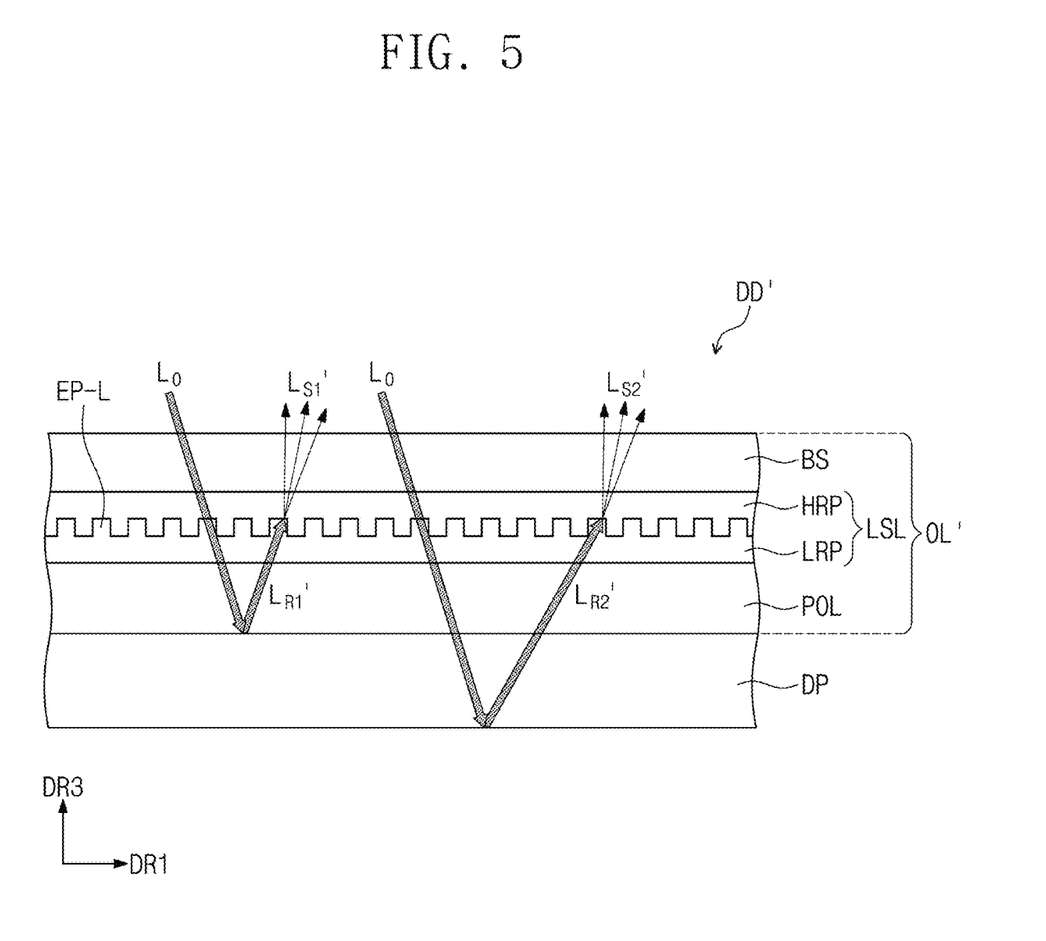
FIG. 5 is a schematic cross-sectional view illustrating a light path in a comparative display device.
Figure 6A:
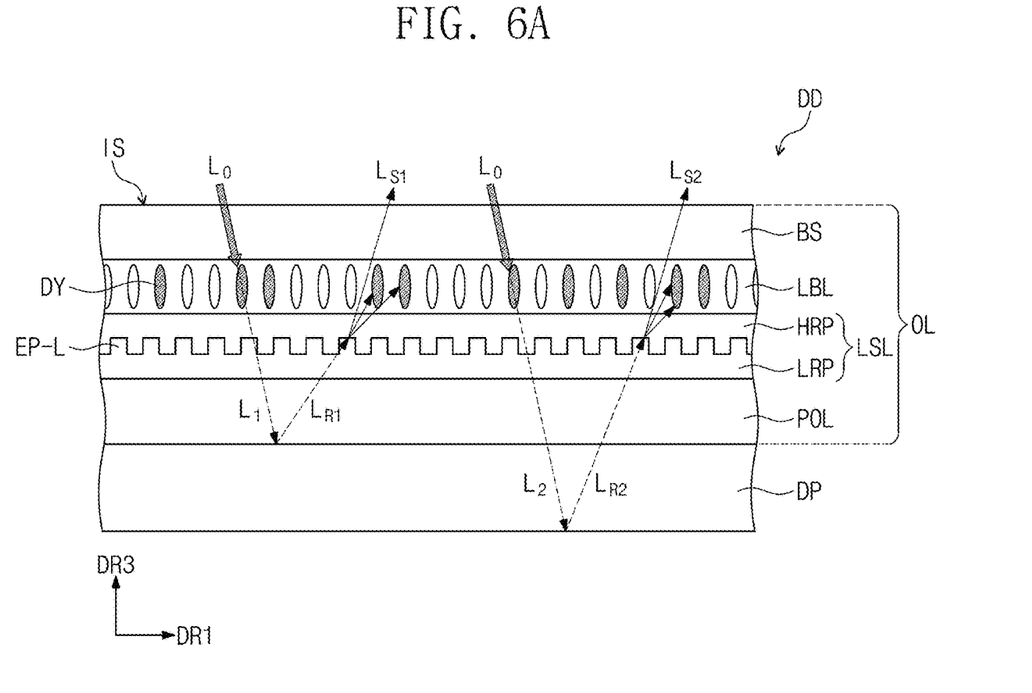
FIGS. 6A and 6B are schematic cross-sectional views illustrating a light path in a display device, according to an embodiment.
Figure 6B:
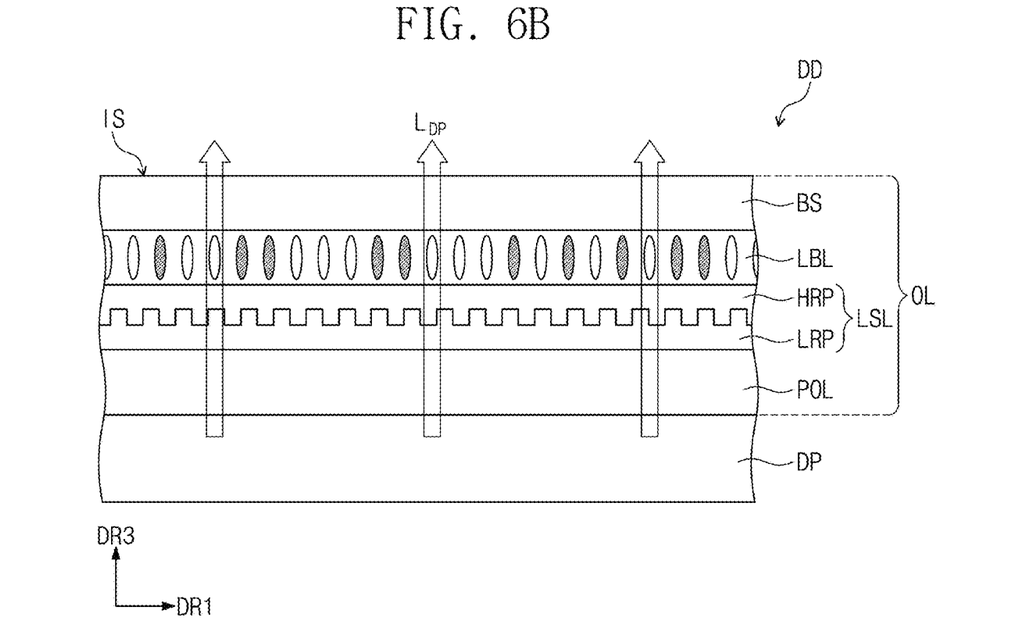

FIG. 5 is a schematic view illustrating a light path in a prior art display device, and FIGS. 6A and 6B are schematic views illustrating a light path in a display device according to an embodiment.

A prior art display device DD' in FIG. 5 does not include the light blocking layer LBL in comparison with the display device DD according to an embodiment. Referring to FIG. 5, in the display device DD', a portion of the external light $L_O$ that is incident to the display device DD' from the outside of the display device DD' may be reflected at an interface between the liquid crystal display panel DP and the plurality of optical layers OL', at an interface between two adjacent optical layers of the plurality of optical layers OL', or at an interior surface of the liquid crystal display panel DP. In FIG. 5, a case in which the external light $L_O$ is reflected at the interface between the liquid crystal display panel DP and the polarizing layer POL and a case in which the external light $L_O$ is reflected at the inside of the liquid crystal display panel DP, are illustrated.

The external light $L_O$ may be reflected at the interface between the liquid crystal display panel DP and the polarizing layer POL, and incident to the light scattering layer LSL, is reflected light $L_{R1}$. The reflected light $L_{R1}'$ is incident to the light scattering layer LSL, and may be diffracted by a protruding portion EP-L of the low refractive pattern part LRP of the light scattering layer LSL and output to the outside of the display device DD'. Here, output light $L_{S1}'$ may be diffracted by the protruding portion EP-L and scattered in various directions, and accordingly, the degradation of the display quality such as the formation of a rainbow mura may result.

Also, the external light $L_O$ may be reflected at the inside of the liquid crystal display panel DP. The external light $L_O$ provided to the inside of the liquid crystal display panel DP may be reflected as reflected light $L_{R2}'$ and may be incident to the light scattering layer LSL. The reflected light LR2' incident to the light scattering layer LSL may be diffracted by a protruding portion EP-L of the low refractive pattern part LRP of the light scattering layer LSL and output to the outside of the display device DD' as output light $L_{S2}'$. Here, output light $L_{S2}'$ may be diffracted at the protruding portion EP-L and scattered in various directions, and accordingly, the degradation of the display quality such as the formation of a rainbow mura may result.

That is, in the display device DD', when the external light is incident inside of the display device DD', as the external light is reflected at the inside of the display device DD' and then refracted or scattered by the light scattering layer LSL, there may be a degradation in the display quality of the display device DD'.

FIGS. 6A and 6B are schematic views illustrating a path of external light $L_O$ incident to the display device DD according to an embodiment. Here, the plurality of optical layers OL include the light scattering layer LSL and the light blocking layer LBL.

Referring to FIG. 6A, a portion of the external light $L_O$ that is incident to the display device DD from the outside of the display device DD may be reflected at an interface between the liquid crystal display panel DP and the plurality of optical layers OL, at an interface between two adjacent optical layers of the plurality of optical layers OL, or at the inside of the liquid crystal display panel DP. In FIG. 6A, a case in which the external light $L_O$ is reflected at the interface between the liquid crystal display panel DP and the polarizing layer POL and a case in which the external light $L_O$ is reflected at the inside of the liquid crystal display panel DP are illustrated.

The external light $L_O$ incident on the outer surface of the display device DD may be transmitted through the light blocking layer LBL and be directed toward the liquid crystal display panel DP. The external light $L_O$ is partially absorbed by the dichroic pigment DY of the light blocking layer LBL, and light $L_1$, which is an amount of light less than the amount of the incident external light $L_O$, may be directed toward the liquid crystal display panel DP. The light $L_1$ may be reflected at the interface between the liquid crystal display panel DP and the polarizing layer POL as reflected light $L_{R1}$.

The reflected light $L_{R1}$, which is reflected at the interface between the liquid crystal display panel DP and the polarizing layer POL, may be incident on a surface of the light scattering layer LSL. The light $L_{R1}$ incident on the light scattering layer LSL may be diffracted by the protruding portion EP-L of the low refractive pattern part LRP of the light scattering layer LSL and output to the outside of the display device DD. Here, a portion of light diffracted by the protruding portion EP-L of the low refractive pattern part LRP may be absorbed by the light blocking layer LBL.

That is, a portion of the reflected light $L_{R1}$, which is reflected at the interface between the liquid crystal display panel DP and the polarizing layer POL, is absorbed by the dichroic pigment DY of the light blocking layer LBL, and refracted light $L_{S1}$, which is an amount of light less than the amount of the reflected light $L_{R1}$, may be emitted to the outside of the display device DD.

Similarly, as the external light $L_0$ is partially absorbed by the dichroic pigment DY of the light blocking layer LBL of the display device DD, light $L_2$, which is an amount of light less than the amount of the incident external light $L_0$, may be directed to the inside of the liquid crystal display panel DP.

The light $L_2$, which is directed to the inside of the liquid crystal display panel DP, may be reflected by a surface inside of the liquid crystal display panel DP as reflected light $L_{R2}$. The reflected light $L_{R2}$, which is reflected by a surface inside of the liquid crystal display panel DP, may be incident to the light scattering layer LSL. The reflected light $L_{R2}$ incident to the light scattering layer LSL may be diffracted by the protruding portion EP-L of the low refractive pattern part LRP of the light scattering layer LSL. Also, the reflected light $L_{R2}$, which is reflected at the inside of the liquid crystal display panel DP, may be transmitted through the light scattering layer LSL and the light blocking layer LBL and be output to the outside of the display device DD as output light $L_{S2}$. The output light $L_{S2}$ may be an amount of light less than the amount of the light $L_{R2}$ reflected at the liquid crystal display panel DP. That is, a portion of the reflected light $L_{R2}$ is diffracted by the protruding portion EP-L and scattered in various directions and partially absorbed by the light blocking layer LBL.

Accordingly, since the display device DD according to an embodiment includes the light blocking layer LBL as an optical layer in the plurality of optical layers OL in addition to the light scattering layer LSL, the degradation of the display quality, which may be generated when external light is incident to a surface on the inside of the display device DD and then output as a reflected light, may be prevented. In particular, the display device DD according to an embodiment may reduce external light incident at an inclined manner with respect to the display surface IS, from being transmitted toward the liquid crystal display panel DP and may also reduce an amount of light reflected by the liquid crystal display panel DP and the plurality of optical layers OL and subsequently emitted from the display device.

FIG. 6B is a view illustrating a light path of light $L_{DP}$ provided from the liquid crystal display panel DP in the display device DD. That is, since the light $L_{DP}$ provided from the liquid crystal display panel DP in the display device DD is vertically incident on the light blocking layer LBL, and most of the vertically incident light is transmitted without being absorbed by the dichroic pigment DY, an amount of the light emitted from the liquid crystal display panel DP may not be reduced, and thus the luminance of the display device DD according to an embodiment may be maintained similar to that when the light blocking layer LBL is not provided.

That is, referring to FIGS. 6A and 6B, when the display device DD according to an embodiment includes the light scattering layer LSL disposed on the polarizing layer POL and the light blocking layer LBL disposed on or below the polarizing layer POL, the degradation of the display quality due to the external light may improve while maintaining excellent luminance characteristics. Without being limited by theory, it is understood that the light blocking layer LBL including the liquid crystal molecule and the dichroic pigment, each of which are vertically oriented with respect to the display surface of the display device DD to transmit light vertically incident in a direction toward the display surface IS of the liquid crystal display panel DP, the light blocking layer effectively blocks light incident in an inclined manner to the display surface IS.

Figure 7:
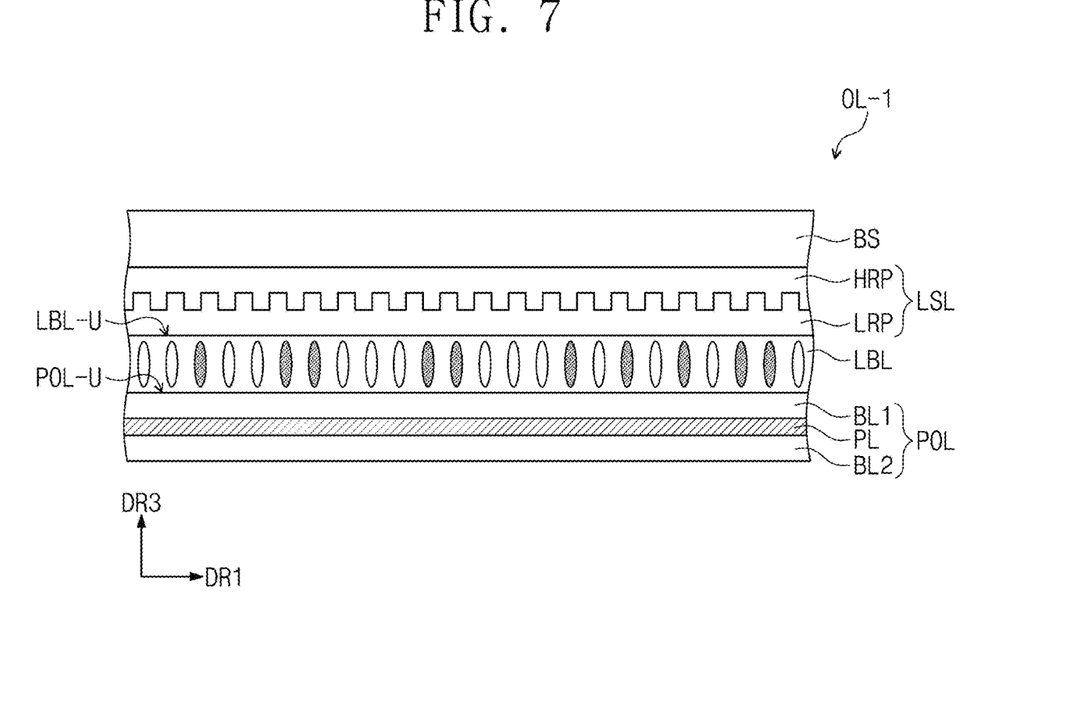
FIGS. 7 to 9 are cross-sectional views illustrating a plurality of optical layers according to various embodiments.
Figure 8:
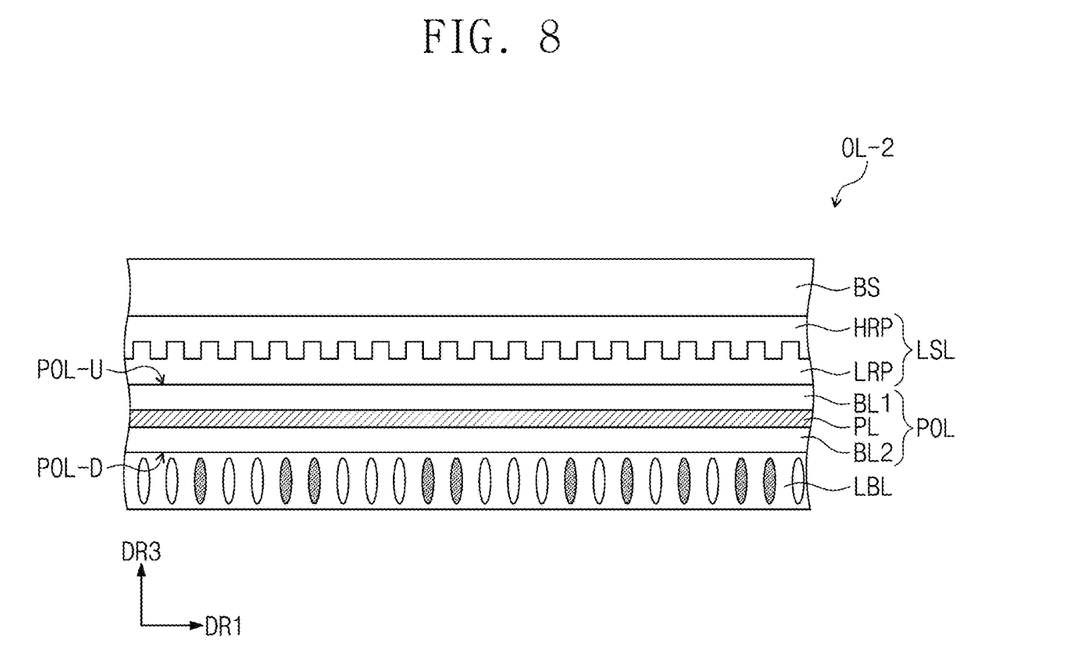
Figure 9:
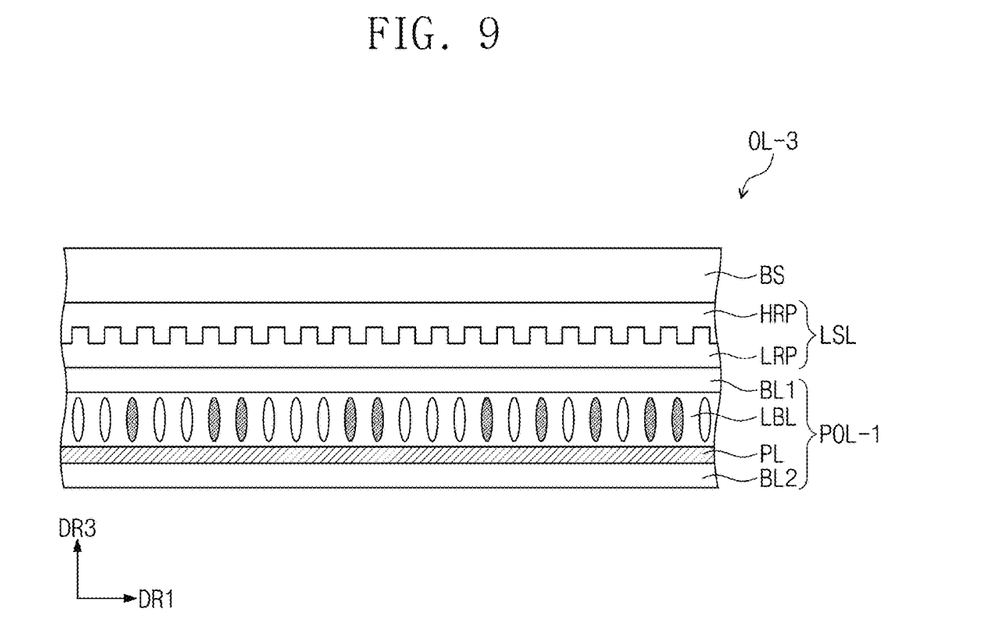

FIGS. 7 to 9 are cross-sectional views illustrating different configurations of the optical layers according to an embodiment. In describing embodiments in FIGS. 7 to 9, features overlapping those described in FIGS. 1 to 4 will not be described again, and different aspects will be mainly described.

Each of the plurality of optical layers OL-1, OL-2, and OL-3 according to respective embodiments in FIGS. 7 to 9, includes a light scattering layer LSL and a light blocking layer LBL. The light scattering layer LSL includes a low refractive pattern part LRP and a high refractive pattern part HRP, where the high refractive pattern part HRP has a refractive index greater than the refractive index of the low refractive pattern part LRP. Also, each of the plurality of optical layers OL-1, OL-2, and OL-3 according to an embodiment in FIGS. 7 to 9 further includes a base substrate BS. Optionally, the base substrate BS of each of the plurality of optical layers OL-1, OL-2, and OL-3 according to an embodiment may be omitted. The plurality of optical layers OL-1 according to an embodiment shown in FIG. 7, includes a polarizing layer POL, a light blocking layer LBL disposed on the polarizing layer POL, and a light scattering layer LSL disposed on the light blocking layer LBL. In an embodiment, the light blocking layer LBL may be disposed directly on a top surface POL-U of the polarizing layer POL, and the light scattering layer LSL may be disposed directly on a top surface LBL-U of the light blocking layer LBL.

The plurality of optical layers OL-1 according to an embodiment in FIG. 7 may have the light blocking layer LBL and the light scattering layer LSL, in a different configuration as compared to the plurality of optical layers OL in the embodiment described in FIG. 2. The plurality of optical layers OL-1 according to the embodiment in FIG. 7 may be included in the above-described display device DD according to an embodiment and may realize the display device DD having reduced degradation in the display quality due to external light, while simultaneously producing excellent luminance characteristics and viewing angle characteristics.

FIG. 8 is a cross-sectional view illustrating a plurality of optical layers OL-2 in which a light blocking layer LBL is disposed below a polarizing layer POL, according to an embodiment. The plurality of optical layers OL-2 according to an embodiment may include the light blocking layer LBL, the polarizing layer POL, and a light scattering layer LSL, which are sequentially laminated in a direction extending along the third directional axis DR3, that is, a thickness direction.

The polarizing layer POL may include a linear polarizer layer PL. Also, first and second protection layers BL1 and BL2 disposed on and below the polarizing layer POL may be further provided.

In the plurality of optical layers OL-2 according to an embodiment, the light blocking layer LBL may be disposed directly on a bottom surface POL-D of the polarizing layer POL, and the light scattering layer LSL may be disposed directly on a top surface POL-U of the polarizing layer POL. For example, in an embodiment, the light blocking layer LBL may be disposed directly on a bottom surface of the protection layer BL2, which is disposed on the bottom surface of the linear polarizer layer PL, and the light scattering layer LSL may be disposed directly on a top surface of the protection layer BL1, which is disposed on the top surface of the linear polarizer layer PL.

In the plurality optical layers OL-3 according to an embodiment shown in FIG. 9, a light blocking layer LBL may be disposed on a linear polarizer layer PL. For example, the light blocking layer LBL may be disposed between the linear polarizer layer PL and the protection layer BL1. That is, in an embodiment, a polarizing layer POL-1 may further include the light blocking layer LBL in addition to the linear polarizer layer PL. In an embodiment in FIG. 9, the light blocking layer LBL may be disposed directly on a top surface of the linear polarizer layer PL.

In the optical layers OL-3 according to an embodiment, the light blocking layer LBL may be provided inside of the polarizing layer POL-1, and the light scattering layer LSL may be disposed on the polarizing layer POL-1. The light scattering layer LSL may be disposed directly on the upper (top) surface of the polarizing layer POL-1.

In FIGS. 7 to 9, the optical layers OL-1, OL-2, and OL-3 are illustrated, in which the laminated sequence of the linear polarizer layer PL, the light scattering layer LSL, and the light blocking layer LBL are varied. The optical layers OL-1, OL-2, and OL-3 according to an embodiment may improve a display quality of the display device DD (refer to FIG. 1) by including the light blocking layer LBL including the dichroic pigment and the reactive mesogen. The light blocking layer LBL blocks external light incident to the display surface IS (refer to FIG. 1) from penetrating inside the display device DD (refer to 1) from a side surface thereof, or may block a portion of external light which has entered and been reflected inside of the display device DD (refer to FIG. 1) from being emitted to the outside of the display device DD.

Also, the dichroic pigment and the reactive mesogen in the light blocking layer LBL may each be vertically aligned with respect to the display surface IS (refer to FIG. 1) to effectively transmit light output from the liquid crystal display panel DP (refer to FIG. 1), thereby minimizing reduction in luminance of the display device DD.

Figure 10:
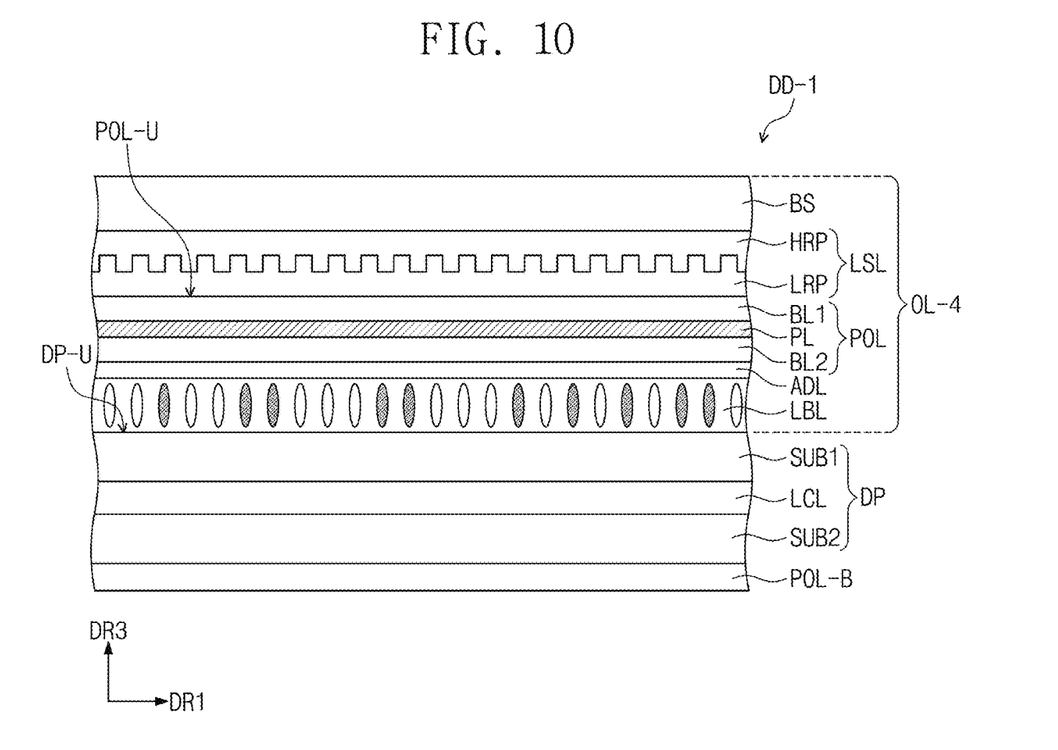
FIG. 10 is a cross-sectional view illustrating a portion of a display device according to an embodiment.

FIG. 10 is a cross-sectional view illustrating a display device DD-1 according to an embodiment. The display device DD-1 in FIG. 10 differs from the display device DD illustrated in FIG. 2, in the plurality of optical layers OL-4.

The display device DD-1 in FIG. 10 includes a liquid crystal display panel DP and the plurality of optical layers OL-4 disposed on the liquid crystal display panel DP. The plurality of optical layers OL-4 may include a polarizing layer POL including a linear polarizer layer PL, a first protection layer BL1, and a second protection layer BL-2, a light blocking layer LBL disposed below the polarizing layer POL, and a light scattering layer LSL disposed on the polarizing layer POL. That is, in an embodiment, the plurality of optical layers OL-4 may include the light blocking layer LBL, the polarizing layer POL, and the light scattering layer LSL, which are sequentially laminated in the direction of the third directional axis DR3, that is, a thickness direction thereof.

Also, the display device DD-1 may further include a lower polarizing layer POL-B disposed below the liquid crystal display panel DP. The lower polarizing layer POL-B may be provided as a film type layer, and may be applied on a surface of a second substrate SUB2. Also, the lower polarizing layer POL-B may be an in-cell type provided as a layer between the second substrate SUB2 and the liquid crystal layer LCL.

Referring to FIG. 10, in an embodiment, the light blocking layer LBL may be disposed directly on the liquid crystal display panel DP. That is, in an embodiment, the light blocking layer LBL may be disposed directly on a first substrate SUB1 which defines a top surface DP-U of the liquid crystal display panel DP.

Also, an adhesive layer ADL may be further disposed between the light blocking layer LBL and the polarizing layer POL. The adhesive layer ADL may be an optically clear adhesive layer. The adhesive layer ADL may be used to couple (adhere) the light blocking layer LBL provided on the liquid crystal display panel DP and the polarizing layer POL (provided together with the light scattering layer LSL) to each other. In an embodiment, the light scattering layer LSL may be disposed directly on a top surface POL-U of the polarizing layer POL.

The display device DD-1 according to an embodiment in FIG. 10 may improve display quality by minimizing degradation which occurs due to incident external light, while maintaining luminance characteristics, by including the light blocking layer LBL in the optical layers OL-4 in addition to the light scattering layer LSL.

The display device according to an embodiment may improve the display quality by minimizing degradation which occurs due to incident external light, while maintaining the luminance characteristics and the improved viewing angle characteristics, by including the light scattering layer on the linear polarizer and the light blocking layer provided on or below the linear polarizer.

The display device according to an embodiment may improve the display quality by minimizing degradation, which occurs due to incident external light and diffraction of reflected light while maintaining the excellent luminance characteristics, by including the dichroic pigment and the reactive mesogen in the light blocking layer to effectively block light incident to the light blocking layer (e.g., side light) while still transmitting vertically incident light.

An embodiment may provide the display device having the improved display quality by arranging the light blocking layer including the dichroic pigment and the reactive mesogen on the liquid crystal display panel.

An embodiment may provide the display device having the improvement in the display quality by minimizing degradation due to the external light, and while maintaining the improved viewing angle characteristics, by including the light blocking layer including the dichroic pigment and the reactive mesogen in addition to the light scattering layer.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:
1. A display device comprising:
a liquid crystal display panel; and
a plurality of optical layers disposed on the liquid crystal display panel,
wherein the plurality of optical layers comprises:
a polarizing layer comprising a linear polarizer layer;
a light scattering layer disposed on the polarizing layer and comprising a first refractive pattern part and a second refractive pattern part, wherein a refractive index of the second refractive pattern part is greater than a refractive index of the first refractive pattern part; and a light blocking layer disposed on a top surface of the linear polarizer layer, and comprising a dichroic pigment and a reactive mesogen.

2. The display device of claim 1, wherein the reactive mesogen comprises a liquid crystal molecule and a polymerization group bonded to an end of the liquid crystal molecule.

3. The display device of claim 2, wherein the liquid crystal molecule is vertically aligned with respect to a top surface or a bottom surface of the light blocking layer, and the dichroic pigment is disposed in parallel to the liquid crystal molecule.

4. The display device of claim 2, wherein a major axis of the dichroic pigment and a major axis of the liquid crystal molecule are each independently aligned at an angle of about 85° or greater and 90° or less with respect to a top surface of the liquid crystal display panel.

5. The display device of claim 1, wherein the light scattering layer is disposed directly on the polarizing layer, and
the light blocking layer is disposed directly on the light scattering layer.

6. The display device of claim 1, wherein the first refractive pattern part comprises a plurality of protruding portions with each protruding portion extending in a lengthwise direction and having a stripe shape, and
the second refractive pattern part comprises a plurality of recessed portions corresponding to the plurality of protruding portions.

7. The display device of claim 1, wherein the first refractive pattern part comprises a plurality of cavities defined in a top surface thereof, and
the second refractive pattern part comprises a plurality of projections nested in the plurality of cavities.

8. The display device of claim 1, wherein at least one of the first refractive pattern part or the second refractive pattern part further comprises at least one scattering particle of $TiO_2$, $SiO_2$, ZnO, $Al_2O_3$, $BaSO_4$, $CaCO_3$, or $ZrO_2$.

9. The display device of claim 1, wherein at least one of the first refractive pattern part or the second refractive pattern part further comprises a light absorbing agent.

10. The display device of claim 1, wherein a difference between the refractive index of the second refractive pattern part and the refractive index of the first refractive pattern part is about 0.1 or greater.

11. The display device of claim 1, wherein an amount of the dichroic pigment is about 0.1 weight percent or greater and 20 weight percent or less, based on a total weight of the dichroic pigment and the reactive mesogen.

12. The display device of claim 1, wherein the light blocking layer is disposed directly on a top surface of the polarizing layer, and
the light scattering layer is disposed directly on a top surface of the light blocking layer.

13. The display device of claim 1, wherein the polarizing layer further comprises a protection layer disposed on and below the linear polarizer layer.

14. The display device of claim 13, wherein the light blocking layer is disposed between the linear polarizer layer and the protection layer.

15. The display device of claim 1, wherein
the plurality of optical layers further comprises an adhesive layer disposed between the light blocking layer and the polarizing layer.

16. The display device of claim 1, wherein the plurality of optical layers further comprises a base substrate, and
the base substrate is an uppermost layer of the plurality of optical layers.

17. The display device of claim 1, wherein the light scattering layer is disposed between the linear polarizer layer and the light blocking layer, or
wherein the light blocking layer is disposed between the linear polarizer layer and the light scattering layer.

18. A display device comprising:
a liquid crystal display panel comprising a first substrate and a second substrate, which face each other, and a liquid crystal layer disposed between the first substrate and the second substrate;
a first polarizing layer disposed on the liquid crystal display panel;
a second polarizing layer disposed below the liquid crystal display panel, and comprising a linear polarizer;
a light scattering layer disposed on the first polarizing layer and comprising a first refractive pattern part and a second refractive pattern part disposed on the first refractive pattern part, wherein a refractive index of the second refractive pattern part is greater than a refractive index of the first refractive pattern part;
a first protective layer disposed directly on a top surface of the first polarizing layer, and disposed between the first polarizing layer and the light scattering layer;
a second protective layer disposed directly on a bottom surface of the first polarizing layer; and
a light blocking layer disposed on a bottom surface of the second protective layer, and comprising a dichroic pigment and a reactive mesogen,
wherein the first refractive pattern part comprises a plurality of recessed portions, the second refractive pattern part comprises a plurality of protruding portions nested in the plurality of recessed portion, and each of the plurality of protruding portions has a trapezoidal shape, a rectangular shape, or a combination thereof; or
wherein the second refractive pattern part comprises a plurality of recessed portions, the first refractive pattern part comprises a plurality of protruding portions nested in the plurality of recessed portion, and each of the plurality of protruding portions has a trapezoidal shape, a rectangular shape, or a combination thereof.

19. The display device of claim 18, wherein the reactive mesogen comprises a liquid crystal molecule, and
a major axis of the liquid crystal molecule is vertically aligned with respect to a top surface or a bottom surface of the first polarizing layer.

20. The display device of claim 19, wherein a major axis of the dichroic pigment is parallel to an extension direction of the major axis of the liquid crystal molecule.

* * * * *